US008560842B2

(12) United States Patent
Tsujimoto

(10) Patent No.: US 8,560,842 B2
(45) Date of Patent: Oct. 15, 2013

(54) COMMUNICATION APPARATUS

(75) Inventor: Shohei Tsujimoto, Kuwana (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 473 days.

(21) Appl. No.: 12/732,966

(22) Filed: Mar. 26, 2010

(65) Prior Publication Data
US 2010/0250924 A1    Sep. 30, 2010

(30) Foreign Application Priority Data
Mar. 31, 2009    (JP) ................. 2009-084512

(51) Int. Cl.
*H04L 29/06*    (2006.01)

(52) U.S. Cl.
USPC ......................................... 713/162; 380/278

(58) Field of Classification Search
USPC .................. 713/162, 171; 380/278, 277, 282
See application file for complete search history.

(56) References Cited

U.S. PATENT DOCUMENTS

| 7,093,288 | B1 | 8/2006 | Hydrie et al. | |
| 7,512,791 | B1* | 3/2009 | Sato | 713/166 |
| 7,733,512 | B2 | 6/2010 | Kimura | |
| 7,903,822 | B1 | 3/2011 | Hair et al. | |
| 8,059,818 | B2 | 11/2011 | Asokan et al. | |
| 2001/0005682 | A1* | 6/2001 | Terao et al. | 455/550 |
| 2002/0099941 | A1* | 7/2002 | Tanimoto | 713/168 |
| 2003/0051146 | A1* | 3/2003 | Ebina et al. | 713/185 |
| 2003/0099361 | A1 | 5/2003 | Uchida | |
| 2004/0212841 | A1* | 10/2004 | Endo | 358/403 |
| 2006/0053278 | A1* | 3/2006 | Tanimoto et al. | 713/150 |
| 2007/0180236 | A1 | 8/2007 | Kuroyanagi et al. | |
| 2008/0056502 | A1 | 3/2008 | Okamoto | |

FOREIGN PATENT DOCUMENTS

| JP | 11-150554 | 6/1999 |
| JP | 2000-183951 | 6/2000 |
| JP | 2000-228727 | 8/2000 |
| JP | 2001-211306 | 8/2001 |
| JP | 2001-352338 A | 12/2001 |
| JP | 2002-118546 | 4/2002 |
| JP | 2002-190796 A | 7/2002 |

(Continued)

OTHER PUBLICATIONS

Japanese publication No. JP 2002-02190796, Publication Date: Jul. 5, 2002, Machine English Translation.*

(Continued)

*Primary Examiner* — Samson Lemma
(74) *Attorney, Agent, or Firm* — Scully, Scott, Murphy & Presser, P.C.

(57) ABSTRACT

A communication apparatus includes: a first storage unit registering a plurality of addresses of a plurality of communication apparatuses; a command sending unit sending a first command for requesting a first public key, which corresponds to a first secret key of the first communication apparatus, to the address of the first communication apparatus; a response receiving unit receiving from the first communication apparatus a first response including the first public key; a storage control unit associating the first public key the address of the first communication apparatus and registering the first public key; an encrypted data generating unit encrypting first data, which is to be sent to the first communication apparatus, using the first public key registered in association with the address of the first communication apparatus to generate first encrypted data; and a data sending unit sending the first encrypted data to the address of the first communication apparatus.

9 Claims, 9 Drawing Sheets

(56) References Cited

FOREIGN PATENT DOCUMENTS

| | | |
|---|---|---|
| JP | 2002-368823 | 12/2002 |
| JP | 2003-229847 | 8/2003 |
| JP | 2003-318873 | 11/2003 |
| JP | 2005-141461 | 6/2005 |
| JP | 2006-060369 A | 3/2006 |
| JP | 2006-074637 | 3/2006 |
| JP | 2007-004440 | 1/2007 |
| JP | 2007-168099 | 7/2007 |
| JP | 2007-208409 | 8/2007 |
| JP | 2007-208429 A | 8/2007 |
| JP | 2007-318217 | 12/2007 |
| JP | 2008-058877 | 3/2008 |
| JP | 2010-232745 | 10/2010 |

OTHER PUBLICATIONS

Japanese Official Action dated Mar. 8, 2011 together with an English language translation from JP 2009-084512.

Japanese Official Action dated Mar. 8, 2011 together with an English language translation from JP 2009-084513.

U.S. Official Action dated Aug. 1, 2012 from related U.S. Appl. No. 12/726,737.

* cited by examiner

FIG. 2

| DEVICE SETTING TABLE | |
|---|---|
| SETTING ITEM | SETTING CONTENTS |
| SMTP SERVER PORT | sample.smtp.com:25 |
| POP3 SERVER PORT | sample.pop.com:110 |
| RECEIVING ACCOUNT NAME | device_a |
| PASSWORD | * * * * * |
| CERTIFICATE EXCHANGE | ON |
| CERTIFICATE EXCHANGE RESPONSE | ON |

FIG. 4

| | CERTIFICATE TABLE 30 | | | |
|---|---|---|---|---|
| | KIND 90 | MAIL ADDRESS/NAME 92 | CERTIFICATE DATA 94 | SECRET KEY DATA 96 |
| 98 → | CA CERTIFICATE | CA1 | AABBCC... | NONE |
| 102 → | CA CERTIFICATE | CA2 | DDEEFF... | NONE |
| 104 → | SELF-DEVICE CERTIFICATE | SELF-ADDRESS | ABC123... | GHI789... |
| 106 → | DEVICE CERTIFICATE | user_a@mail.com | DEF456... | NONE |
| | ... | ... | ... | ... |
| 108 → | DEVICE CERTIFICATE | user_z@mail.com | XXYYZZ... | NONE |

US 8,560,842 B2

COMMUNICATION APPARATUS

CROSS-REFERENCE TO RELATED APPLICATIONS

This application claims priority from Japanese Patent Application No. 2009-084512 filed on Mar. 31, 2009, the entire subject matter of which is incorporated herein by reference.

TECHNICAL FIELD

The present invention relates to a communication apparatus, and specifically, to a communication apparatus capable of communication using an encryption technique.

BACKGROUND

With communicating data through the Internet, there is a fear of the data being falsified or being viewed by a third party, and there is a problem of ensuring security of data.

There has been proposed a known technique for encrypting data in order to prevent falsification of data or viewing of data by a third party. For example, a communication apparatus X encrypts data using a public key of a communication apparatus Y, and sends the encrypted data to the communication apparatus Y. The communication apparatus Y decodes the encrypted data by a self-secret key and acquires the data. Consequently, a third party can be prevented from sneaking a look at data.

SUMMARY

Illustrative aspects of exemplary embodiments of the present invention may provide an art capability of increasing the possibility of possessing a public key of a receiving party in the case of having to communicate data.

BRIEF DESCRIPTION OF THE DRAWINGS

FIG. 2 shows one example of registered contents of a device setting table;

FIG. 4 shows one example of registered contents of a certificate table;

DETAILED DESCRIPTION

General Overview

Figure 1:
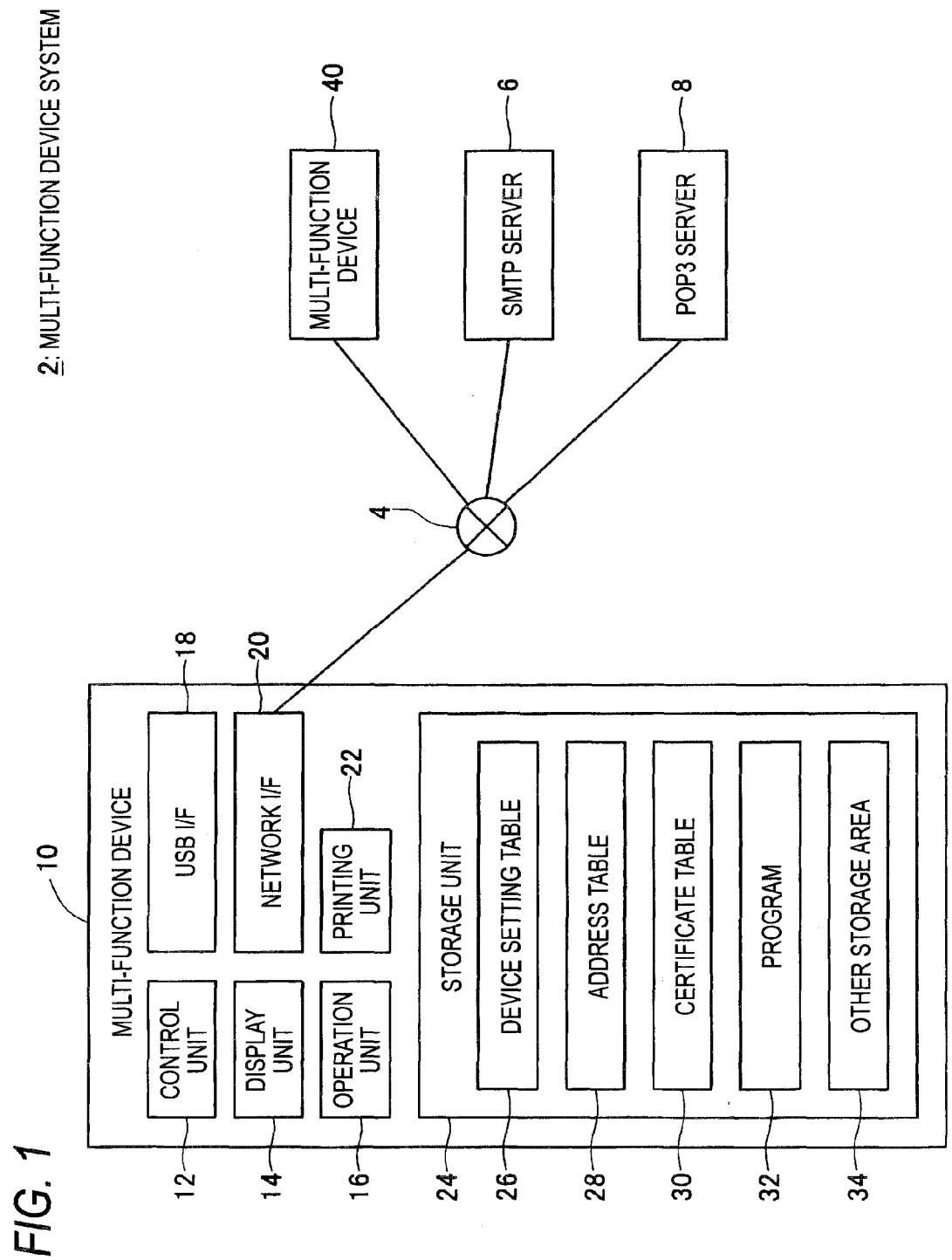
FIG. 1 shows a configuration of a multi-function device system.

When using an encryption technique, it becomes necessary to possess a public key of a communication receiving party. For example, in the known technique, the communication apparatus X cannot encrypt data, which will be sent to the communication apparatus Y, when the communication apparatus X does not possess the public key of the communication apparatus Y. That is, the encryption technique cannot be used when the public key of the communication receiving party is not possessed in the case of having to communicate data.

Therefore, illustrative aspects of exemplary embodiments of the present invention may provide an art capability of increasing the possibility of possessing a public key of a receiving party in the case of having to communicate data.

The art of the present invention relates to a communication apparatus. The "communication apparatus" includes all devices for executing communication processing. The communication processing may be processing for sending data or processing for receiving data. An example of the communication apparatus can include a personal computer (hereinafter called a PC), a server, a printer, a scanner, a copy machine, a facsimile, a multifunction device, etc. The communication apparatus includes a first storage unit, a command sending unit, a response receiving unit, a storage control unit, an encrypted data generating unit and a data sending unit.

An address of another communication apparatus is registered in the first storage unit. Incidentally, the term "a first storage unit" may be referred to as, for example, an "address book". The term "address" includes all addresses capable of communicating with another communication apparatus described above, and includes, for example, an electronic mail address, a network address, a node name, a MAC address, an IP address, etc. The command sending unit sends a first command for requesting a first public key corresponding to a first secret key of a first communication apparatus to an address of the first communication apparatus in the case of registering an address of the first communication apparatus in the first storage unit. The response receiving unit receives a first response including the first public key to the first command. The storage control unit registers the first public key included in the first response in a state of associating the first public key with an address of the first communication apparatus. Incidentally, the storage control unit may register the first public key included in the first response in the first storage unit or other storage units. The encrypted data generating unit generates first encrypted data by encrypting first data using the first public key registered in a state of being associated with the address of the first communication apparatus in the case of having to send the first data to the address of the first communication apparatus. The data sending unit sends the first encrypted data to the address of the first communication apparatus.

According thereto, the first command for requesting the first public key of the first communication apparatus can be sent in the case of registering the address of the first communication apparatus in first storage unit. Consequently, the first public key of the first communication apparatus can be acquired. As a result, it becomes possible to increase a possibility of possessing the public key of the first communication apparatus, which is the communication receiving party, in the case of having to send first data to the first communication apparatus. Further, according to the communication apparatus described above, the first data encrypted using the first public key of the first communication apparatus can be sent to the first communication apparatus.

That is, according to a first illustrative aspect of the invention, there is provided a communication apparatus comprising: a first storage unit that is configured to register a plurality of addresses of a plurality of communication apparatuses; a command sending unit that is configured to, upon receiving a request to register an address of a first communication apparatus in the first storage unit, send a first command for requesting a first public key, which corresponds to a first secret key of the first communication apparatus, to the address of the first communication apparatus; a response receiving unit that is configured to receive from the first communication apparatus a first response including the first public key to the first command; a storage control unit, which is configured to associate the first public key included in the first response with the address of the first communication apparatus, and which is configured to register the first public key; an encrypted data generating unit that is configured to encrypt first data, using the first public key registered in association with the address of the first communication apparatus so as to generate first encrypted data when receiving a request to send the first data to the first communication apparatus; and a data sending unit that is configured to send the first encrypted data to the address of the first communication apparatus.

According to a second illustrative aspect of the invention, the communication apparatus further comprises: a first selective permission unit that is configured to, upon receiving a request to register an address of a new communication apparatus in the first storage unit, allow a user to select whether or not a command for requesting a public key corresponding to a secret key of the new communication apparatus is sent to the address of the new communication apparatus; a second storage unit that is configured to register setting information corresponding to a selection result in the first selective permission unit; and a first determination unit that is configured to, upon registering the address of the first communication apparatus in the first storage unit, determine whether or not the setting information registered in the second storage unit corresponds to a positive selection result, wherein the command sending unit sends the first command if a positive determination is made by the first determination unit.

According thereto, a user can determine whether or not to send the first command to the address of the first communication apparatus newly registered in the first storage unit.

According to a third illustrative aspect of the invention, the communication apparatus further comprises: a communication unit that is configured to execute communication processing when receiving a request to send second data to an address of a second communication apparatus, the address of which is not registered in the first storage unit, the communication processing comprising: sending a second command for requesting a second public key corresponding to a second secret key of the second communication apparatus to the address of the second communication apparatus; and receiving a second response comprising the second public key to the second command, wherein the encrypted data generating unit generates second encrypted data by encrypting the second data using the second public key included in the second response, wherein the data sending unit sends the second encrypted data to the address of the second communication apparatus, and wherein the communication unit does not execute the communication processing when the first data is to be sent to the first communication apparatus.

According thereto, the second public key of the second communication apparatus can be acquired prior to sending the second data in the case of having to send the second data to the address of the second communication apparatus that is not registered in the first storage unit. As a result, the communication apparatus can generate the second encrypted data using the acquired second public key and can send the second encrypted data to the second communication apparatus. On the other hand, in the case of having to send the first data to the first communication apparatus, the address of the first communication apparatus has already been registered in the first storage unit and the first public key has already been acquired. Therefore, even when the above-described communication processing is not executed, the communication apparatus can generate the first encrypted data and can send the first encrypted data to the first communication apparatus. In this case, the communication processing can be omitted, and thus a load of processing can be reduced.

According to a fourth illustrative aspect of the invention, in the communication apparatus, wherein the first command sent by the command sending unit comprises a third public key corresponding to a third secret key of the communication apparatus.

According thereto, the communication apparatus can send the self-public key when the self-public key is not sent to the address of a sending destination of a command.

According to a fifth illustrative aspect of the invention, the communication apparatus further comprises: a command receiving unit that is configured to receive a third command for requesting a fourth public key corresponding to a fourth secret key of the communication apparatus; and a public key sending unit that is configured to send the fourth public key to a sending source of the third command.

According thereto, upon receipt of a command for requesting the self-public key, the self-public key can be sent to the address of a sending source of the command.

According to a sixth illustrative aspect of the invention, the communication apparatus further comprises: a second selective permission unit that is configured to allow a user to select whether or not the fourth public key is to be sent according to the third command; a third storage unit that is configured to register setting information corresponding to a selection result in the second selective permission unit; and a second determination unit which, upon receiving the third command by the command receiving unit, is configured to determine whether or not the setting information registered in the third storage unit corresponds to a positive selection result, wherein the public key sending unit sends the fourth public key to the sending source of the third command if a positive determination is made by the second determination unit.

According thereto, upon receipt of the command for requesting the self-public key, the user can determine whether or not the self-public key is sent to the address of the sending source of the command.

According to a seventh illustrative aspect of the invention, in the communication apparatus, wherein the public key sending unit sends the fourth public key to the sending source of the third command if a public key corresponding to a secret key of the sending source of the third command is included in the third command.

According thereto, upon receipt of the self-public key of the communication apparatus of an address of the sending source of the third command, the self-public key can be sent to the sending source of the third command. That is, the self-public key can be sent to the sending source of the third command if the public key is exchanged.

According to an eighth illustrative aspect of the invention, in the communication apparatus, wherein the storage control unit associates the public key corresponding to the secret key of the sending source of the third command included in the third command with an address of the sending source.

According thereto, by registering the acquired public key in a state of associating the acquired public key with the address of the sending source of the third command, encrypted data using the acquired public key can be sent to the communication apparatus of the sending source of the third command.

According to a ninth illustrative aspect of the invention, in the communication apparatus, wherein the first public key is included in a device certificate authenticated by a certification authority.

Incidentally, a computer program and a control method for implementing the above-described communication apparatus are novel and useful. Further, a communication system including the above-described communication apparatus and other communication apparatus (for example, the first communication apparatus, the second communication apparatus or the communication apparatus of a sending source of the third command) is novel and useful.

Exemplary Embodiments

Exemplary embodiments of the invention will now be described with reference to the drawings.

A part of the art described in the following embodiments is listed.

(Mode 1) A first data may be a common key.

(Mode 2) An encrypted data generating unit may generate an encrypted electronic mail text by encrypting an electronic mail text using the first data (common key). A data sending unit may send electronic mail including an encrypted electronic mail text and a first encrypted data in which the first data (common key) is encrypted to an address of a first communication apparatus.

(Mode 3) A first communication apparatus may further include: a common key acquiring unit that acquires the common key by decoding the first encrypted data by a self-secret key; and an electronic mail text acquiring unit that acquires the electronic mail text by decoding the encrypted electronic mail text using the acquired common key.

(Mode 4) The Encrypted data generating unit may generate digest data by digesting the electronic mail text and generate encrypted text digest data by encrypting the digest data by the self-secret key. The data sending unit may send electronic mail including the encrypted text digest data and the first encrypted data, in which the first data (common key) is encrypted, to the address of the first communication apparatus.

(Mode 5) A first communication apparatus may further include a verification unit, which generates a first digest data by decoding the encrypted digest data using a public key of the communication apparatus, which generates a second digest data by digesting the electronic mail text, and which compares the first digest data with the second digest data.

First Exemplary Embodiment (Configuration of System)

FIG. 1 shows a schematic diagram of a multi-function device system 2 of the first exemplary embodiment. The multi-function device system 2 includes the Internet 4, plural multi-function devices 10, 40, an SMTP server 6 and a POP3 server 8. The plural multi-function devices 10, 40, the SMTP server 6 and the POP3 server 8 are connected to the Internet 4. Incidentally, in FIG. 1, only two multi-function devices 10, 40 are shown, but the number of multi-function devices can be changed properly.

(Encryption Technique by S/MIME)

The multi-function device 10 is a communication apparatus capable of communicating electronic mail using an encryption technique by S/MIME (Secure/Multipurpose Internet Mail Extensions). Incidentally, the multi-function device 40 has a configuration similar to that of the multi-function device 10.

A mechanism at the time of conducting communication of electronic mail using the encryption technique by S/MIME between the multi-function device 10 and the multi-function device 40 will hereinafter be described. The multi-function device 10 encrypts an electronic mail text using a common key and encrypts the common key by a public key of the multi-function device 40. Further, the multi-function device 10 sends electronic mail including the encrypted electronic mail text and the encrypted common key to the multi-function device 40. The public key of the multi-function device 40 is included in a device certificate of the multi-function device 40. It is necessary for the multi-function device 10 to previously acquire the device certificate of the multi-function device 40. Incidentally, information about the certification authority which is an issuing source of the device certificate of the multi-function device 40 and information about the expiration date of the device certificate, an electronic signature generated by the certification authority, etc. in addition to the public key of the multi-function device 40 may be included in the device certificate of the multi-function device 40. The multi-function device 40 decodes the encrypted common key by a self-secret key and acquires the common key. Further, the multi-function device 40 decodes the encrypted electronic mail text using the acquired common key and acquires the electronic mail text. Consequently, a third party can be prevented from sneaking a look at the electronic mail text.

In addition, the multi-function device 10 further attaches the following digest data to the electronic mail. That is, the multi-function device 10 generates digest data by digesting an electronic mail text and encrypts the digest data using a self-secret key and attaches the encrypted digest data to the electronic mail. The multi-function device 40 acquires first digest data by decoding the encrypted digest data using a public key of the multi-function device 10 included in a device certificate of the multi-function device 10. Therefore, it is necessary for the multi-function device 40 to previously acquire the device certificate of the multi-function device 10. The multi-function device 40 generates second digest data by digesting an electronic mail text by itself. The multi-function device 40 can detect an act of falsifying the electronic mail text by comparing the first digest data with the second digest data.

(Configuration of Multi-Function Device)

Subsequently, a configuration of the multi-function device 10 will be described in detail. The multi-function device 10 includes a control unit 12, a display unit 14, an operation unit 16, a USB interface 18, a network interface 20, a printing unit 22, a storage unit 24, etc. The control unit 12 executes processing according to a program 32 stored in the storage unit 24. The display unit 14 displays various pieces of information. The operation unit 16 includes plural keys. A user can input various instructions to the multi-function device 10 by operating the operation unit 16. USB memory (not shown) etc. may be connected to the USB interface 18. The network interface 20 is connected to the Internet 4. The printing unit 22 prints image data.

The storage unit 24 can store a device setting table 26, an address table 28 and a certificate table 30. The storage unit 24 further stores the program 32 to be executed by the control unit 12. Also, the storage unit 24 has a storage area 34 for storing information other than information 26, 28, 30, 32 described above.

(Registered Contents of Device Setting Table)

Subsequently, registered contents of the device setting table 26 (see FIG. 1) of the storage unit 24 will be described. FIG. 2 shows one example of the registered contents of the device setting table 26. The device setting table 26 includes plural pieces of combination information 54 to 66. Each of the pieces of combination information 54 to 66 is information in which a setting item 50 is associated with setting contents 52. The setting item 50 is a name of a kind of setting. The setting contents 52 show the contents of setting. For example, in the combination information 54, an "SMTP server port", which is a name indicating combination of an address and a port number of the SMTP server 6, is written into the setting item 50, and "sample.smtp.com:25", which is combination of an actual address and a port number, is written into the setting contents 52. The pieces of combination information 64, 66 are related to a certificate exchange and a certificate exchange response. Although "ON" is written as the setting contents 52 of the certificate exchange and the certificate exchange response in the example of FIG. 2, A user can select either "ON" or "OFF" by operating the operation unit 16 so as to write "ON" or "OFF" into the setting contents 52 of the certificate exchange and the certificate exchange response.

(Registered Contents of Address Table)

Figure 3:
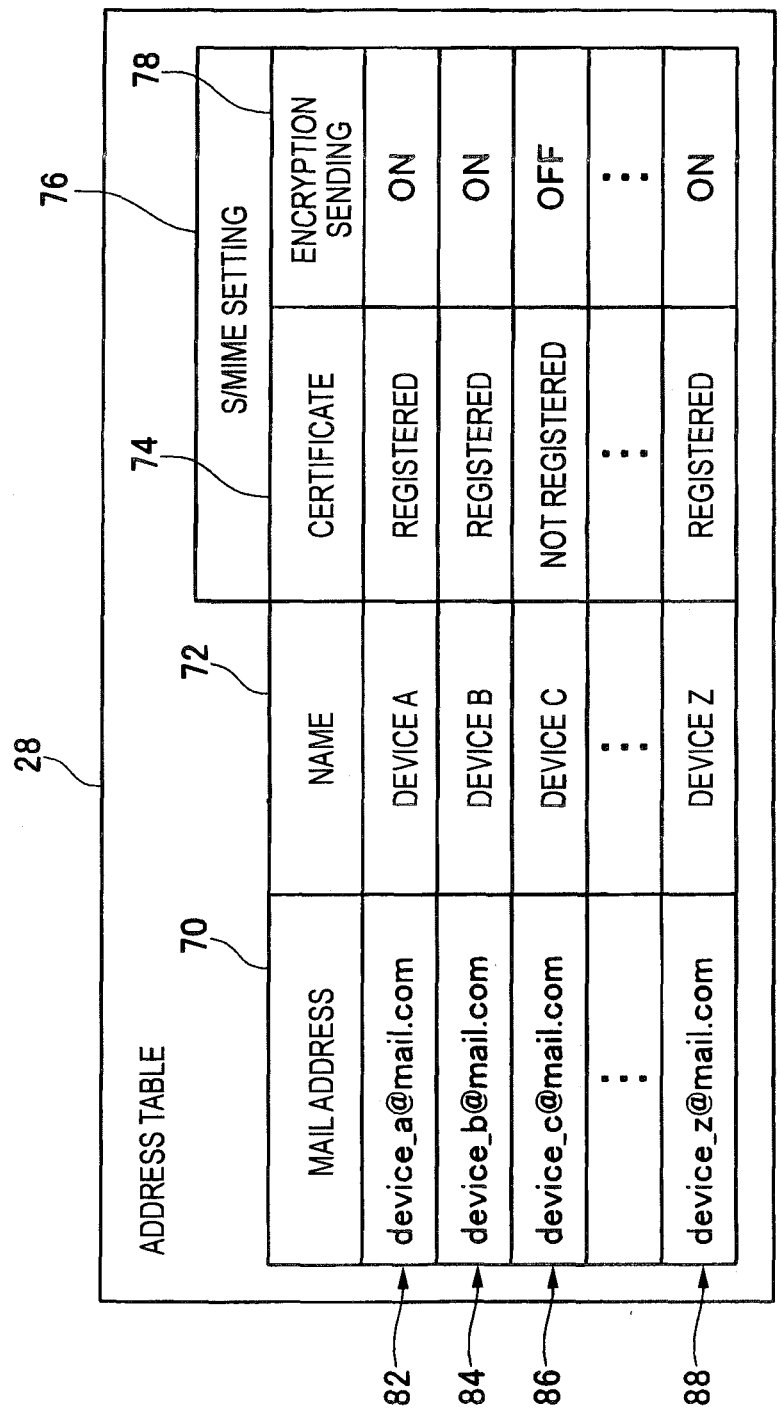
FIG. 3 shows one example of registered contents of an address table.

Subsequently, registered contents of the address table 28 (see FIG. 1) of the storage unit 24 will be described. FIG. 3 shows one example of the registered contents of the address table 28. The address table 28 includes plural pieces of combination information 82 to 88. Each of the pieces of combination information 82 to 88 is information in which a mail address 70 is associated with a name 72 and S/MIME setting 76. The S/MIME setting 76 is a setting for using an encryption technique using S/MIME. The S/MIME setting 76 includes each information about a certificate 74 and encryption sending 78. The mail address 70 shows a registered mail address. In the first exemplary embodiment, plural mail addresses are registered in the address table 28. The example of FIG. 3 illustrates four kinds of mail addresses. The name 72 shows a name of a device corresponding to each of the mail addresses. The certificate 74 shows information as to whether or not a device certificate of a communication apparatus corresponding to each of the mail addresses is registered in the multi-function device 10. When the device certificate is registered, "registered" is written. In contrast, when the device certificate is not registered, "not registered" is written. The encryption sending 78 column shows information as to whether or not an electronic mail text is encrypted in the case of sending electronic mail to a communication apparatus corresponding to each of the mail addresses. In the first exemplary embodiment, when a device certificate of another communication apparatus is registered in the certificate table 30 (see FIG. 1) (which will be described later), "ON" is written into a field of the certificate 74 corresponding to a mail address of its communication apparatus. On the other hand, when the device certificate of another communication apparatus is deleted from the certificate table 30, "OFF" is written into a field of the certificate 74 corresponding to a mail address of its communication apparatus. Incidentally, in the first exemplary embodiment, the user can switch the pieces of combination information 82 to 88 in which "ON" is written into the field of the certificate 74 from "ON" to "OFF" by operating the operation unit 16.

(Registered Contents of Certificate Table)

Subsequently, registered contents of the certificate table 30 (see FIG. 1) of the storage unit 24 will be described. FIG. 4 shows one example of the registered contents of the certificate table 30. The certificate table 30 includes plural pieces of combination information 98 to 108. Each of the pieces of combination information 98 to 108 is information in which a kind 90 is associated with a mail address/name 92, certificate data 94 and secret key data 96. The kind 90 shows a kind of the certificate. A "CA certificate" indicates certificate issued by the certification authority (CA). A "self-device certificate" indicates a device certificate of the multi-function device 10 acquired from the certification authority. A "device certificate" shows a device certificate received from another communication apparatus. The mail address/name 92 shows a name of a certificate or a mail address corresponding to each of the certificates. For example, when a kind of certificate is "CA certificate", the name of the CA is registered. When a kind of certificate is the "self-device certificate", a mail address of the multi-function device 10 is registered. When a kind of certificate is the "device certificate", a mail address of the other communication apparatus is registered. The certificate data 94 may include all the data of various certificates. The secret key data 96 is a secret key of the multi-function device 10. Therefore, the secret key data 96 is not registered in the pieces of combination information 98, 102, 106 and 108 other than the "self-device certificate".

The multi-function device 10 can previously acquire a self-device certificate. For example, the multi-function device 10 sends a request to a predetermined certification authority, and the predetermined certification authority creates a device certificate in response to its request and sends the device certificate to the multi-function device 10. Consequently, the multi-function device 10 can acquire the device certificate. Alternatively, for example, a user can make the certification authority create a device certificate of the multi-function device 10 using an external device (for example, a PC) other than the multi-function device 10. The user could then store the device certificate of the multi-function device 10 acquired in the external device in USB memory. The user inserts the USB memory into the USB interface 18 (see FIG. 1). Consequently, the multi-function device 10 can acquire the device certificate of itself.

(Processing Executed by Multi-Function Device 10 and Multi-Function Device 40)

Figure 5:
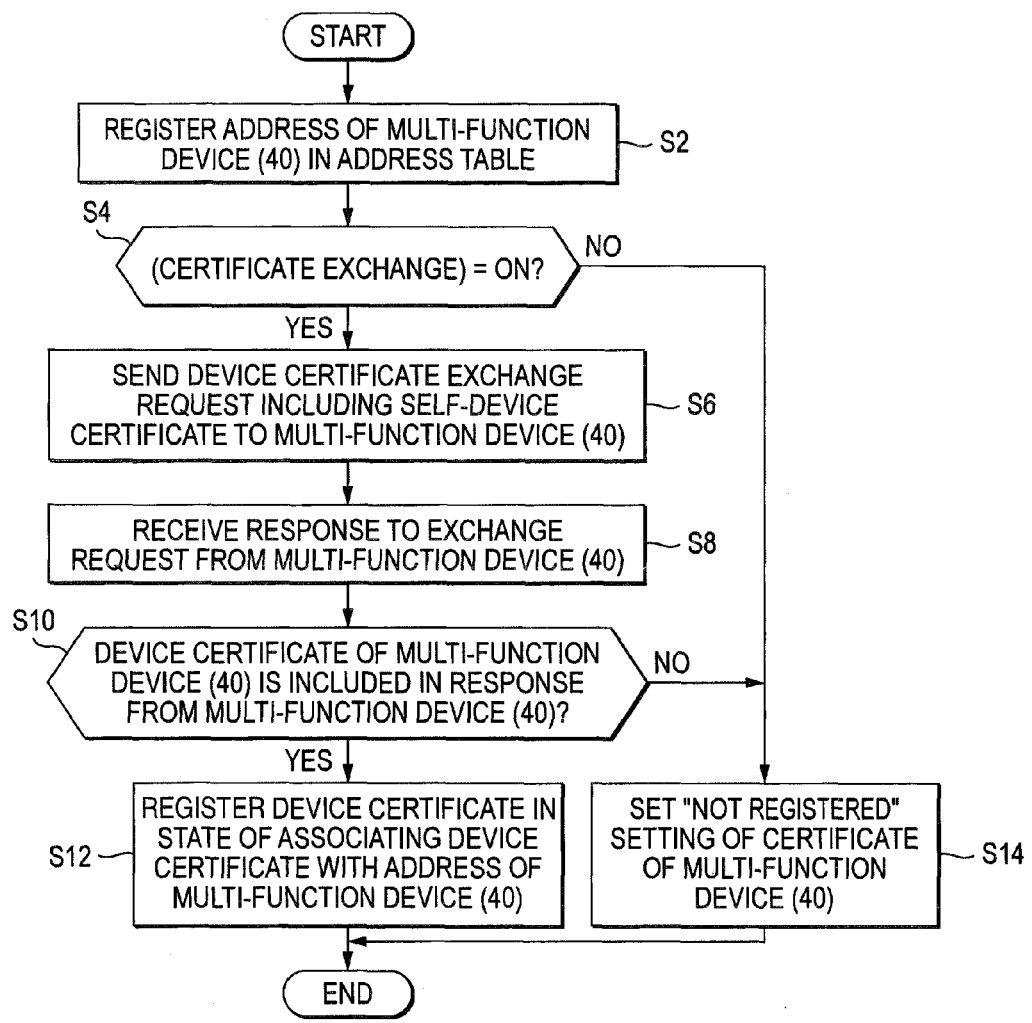
FIG. 5 shows a flowchart of communication processing executed by a multi-function device according to a first exemplary embodiment.

Subsequently, processing executed by each of the control unit 12 of the multi-function device 10 and a control unit 12' of the multi-function device 40 will be described. FIG. 5 shows a flowchart of processing executed when the control unit 12 of the multi-function device 10 registers an electronic mail address. A user can instruct the multi-function device 10 to register an electronic mail address (an electronic mail address of the multi-function device 40 in the first exemplary embodiment) of a new communication apparatus in the address table 28 by operating the operation unit 16. In this case, the control unit 12 registers the electronic mail address of the multi-function device 40 in the address table 28 (S2).

Then, the control unit 12 determines whether or not setting 64 of a certificate exchange (see FIG. 2) of the device setting table 26 of the storage unit 24 becomes "ON" (S4). If the setting 64 of the certificate exchange is "ON" (YES in S4), the control unit 12 proceeds to S6. In contrast, if the setting 64 of the certificate exchange is "OFF" (NO in S4), the control unit 12 proceeds to S14. In S6, the control unit 12 reads a self-device certificate (i.e., the certificate data 94 of the combination information 104) out of the certificate table 30. Then, the control unit 12 sends a device certificate exchange request including the self-device certificate to the multi-function device 40. Incidentally, commands in the first exemplary embodiment are sent and received by electronic mail. That is, the control unit 12 sends the device certificate exchange request to the multi-function device 40 using an electronic mail address registered in the address table 28 as a destination. When the electronic mail is received, the multi-function device, which receives the electronic mail including a command, analyzes an electronic mail text automatically and executes the processing according to its command.

The control unit 12 receives a response to the device certificate exchange request sent in S6 from the multi-function device 40 (S8). In this case, the control unit 12 determines whether or not a device certificate of the multi-function device 40 is included in the received response (S10). If the device certificate is included (YES in S10), the control unit 12 proceeds to S12. In contrast, if the device certificate is not included (NO in S10), the control unit 12 proceeds to S14.

The control unit 12 changes the registered contents of the address table 28 in S12. That is, the control unit 12 turns "on" setting 78 (see FIG. 3) of encryption sending corresponding to the electronic mail address (that is, the electronic mail address registered in S2) of the multi-function device 40. Further, setting 74 (see FIG. 3) of a certificate corresponding to the electronic mail address of the multi-function device 40 is "registered" by the control unit 12. Further, the control unit 12 stores new combination information (see FIG. 4) including the received device certificate in the certificate table 30 (see FIG. 4) of the storage unit 24 in S12. Consequently, in the certificate table 30, the electronic mail address of the multi-function device 40 is written into a field of the mail address 92 and the device certificate of the multi-function device 40 is written into a field of the certificate data 94. As a result, the device certificate of the multi-function device 40 is registered in a state of being associated with the electronic mail address of the multi-function device 40 registered in the address table 28.

When S12 ends, the control unit 12 ends the processing. On the other hand, the control unit 12 changes the stored contents of the address table 28 in S14. That is, the control unit 12 turns "off" the setting 78 (see FIG. 3) of encryption sending corresponding to the electronic mail address of the multi-function device 40. Also, the setting 74 (see FIG. 3) of the certificate corresponding to the electronic mail address of the multi-function device 40 is "not registered" by the control unit 12. When S14 ends, the control unit 12 ends the processing.

Figure 6:
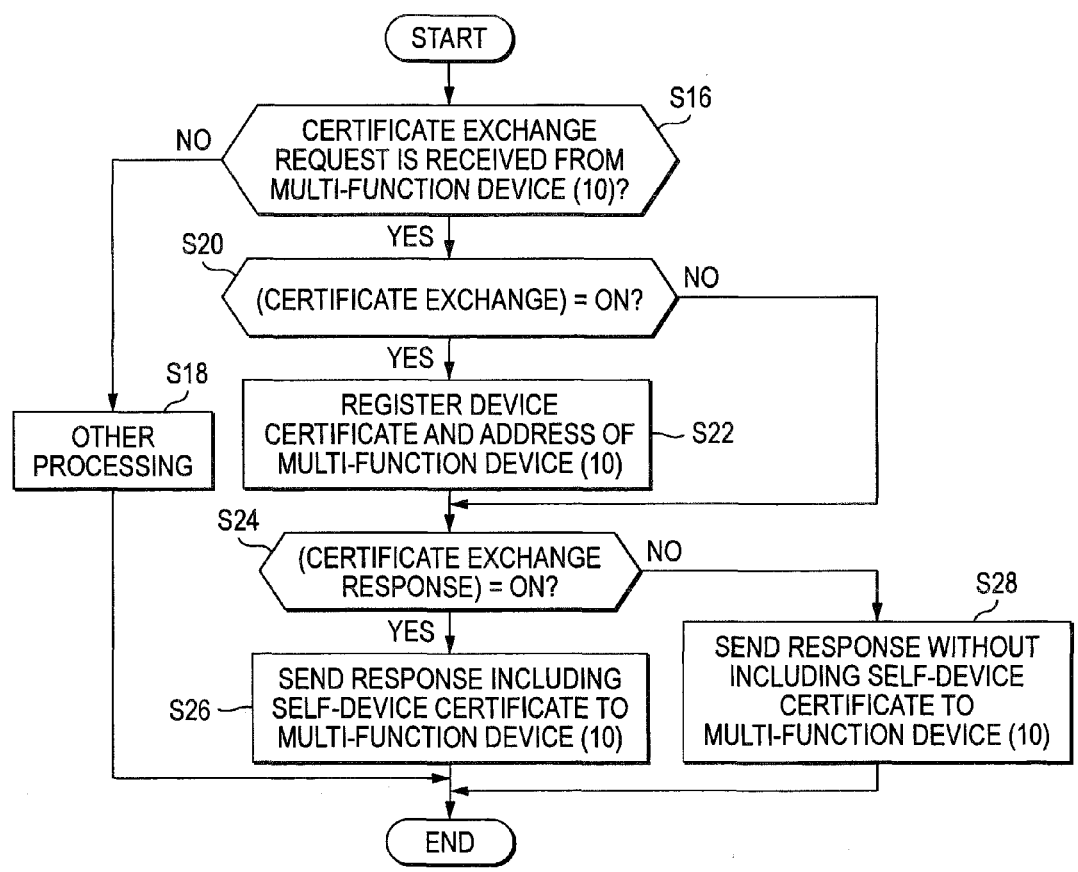
FIG. 6 shows another flowchart of the communication processing executed by the multi-function device according to the first exemplary embodiment.

Subsequently, processing executed by the control unit 12' of the multi-function device 40 will be described. FIG. 6 shows a flowchart of processing in which the control unit 12' of the multi-function device 40 acquires electronic mail from the POP3 server 8. The control unit 12' of the multi-function device 40 starts the present processing in the case of reaching the predetermined timing at which the presence or absence of electronic mail is inquired of the POP3 server 8. Then, the control unit 12' acquires electronic mail addressed to the multi-function device 40 from the POP3 server 8. When the control unit 12' acquires the electronic mail, the control unit 12' determines whether or not the acquired electronic mail is a device certificate exchange request from the multi-function device 10 (S16). If the electronic mail is the certificate exchange request (YES in S16), the control unit 12' proceeds to S20. In contrast, if the electronic mail is not the certificate exchange request (NO in S16), the control unit 12' determines that the acquired electronic mail is encrypted electronic mail, performs receiving processing of electronic mail (S18) (which will be described later) and ends the processing. The control unit 12' determines whether or not setting (setting corresponding to numeral 64 of FIG. 2) of a certificate exchange of the device setting table of the multi-function device 40 is "ON" in S20 (S34). If the setting of the certificate exchange is "ON" (YES in S20), the control unit 12' proceeds to S22. In contrast, if the setting of the certificate exchange is "OFF" (NO in S20), the control unit 12' skips S22 and proceeds to S24.

The control unit 12' changes the stored contents of an address table (a table corresponding to the table 28 of FIG. 3) of the multi-function device 40 in S22. That is, when an electronic mail address of the multi-function device 10 is not registered in the address table, the control unit 12' newly registers the electronic mail address in the address table. Further, the control unit 12' turns "on" setting (setting corresponding to numeral 78 of FIG. 3) of encryption sending corresponding to the electronic mail address of the multi-function device 10. Also, setting (setting corresponding to numeral 74 of FIG. 3) of a certificate corresponding to the electronic mail address of the multi-function device 10 is "registered" by the control unit 12'. When the electronic mail address of the multi-function device 10 is already registered in the address table, the control unit 12' updates the setting of the certificate and the setting of the encryption sending corresponding to the registered electronic mail address. Further, the control unit 12' stores new combination information including the received device certificate in a certificate table (a table corresponding to the table 30 of FIG. 4) of a storage unit in S22. When S22 ends, the control unit 12' proceeds to S24.

Then, the control unit 12' determines whether or not setting (setting corresponding to numeral 66 of FIG. 2) of a certificate exchange response of the device setting table is "ON" in S24. If the setting of the certificate exchange response is "ON" (YES in S24), the control unit 12' proceeds to S26. In contrast, if the setting of the certificate exchange response is "OFF" (NO in S24), the control unit 12' proceeds to S28. The control unit 12' sends a response including the device certificate of the multi-function device 40 to the multi-function device 10 in S26. As a result, the multi-function device 10 determines YES in S10 of FIG. 5. When S26 ends, the control unit 12' ends the processing. On the other hand, the control unit 12' sends a response without including the device certificate of the multi-function device 40 to the multi-function device 10 in S28. As a result, the multi-function device 10 determines NO in S10 of FIG. 5. When S28 ends, the control unit 12' ends the processing.

Figure 7:
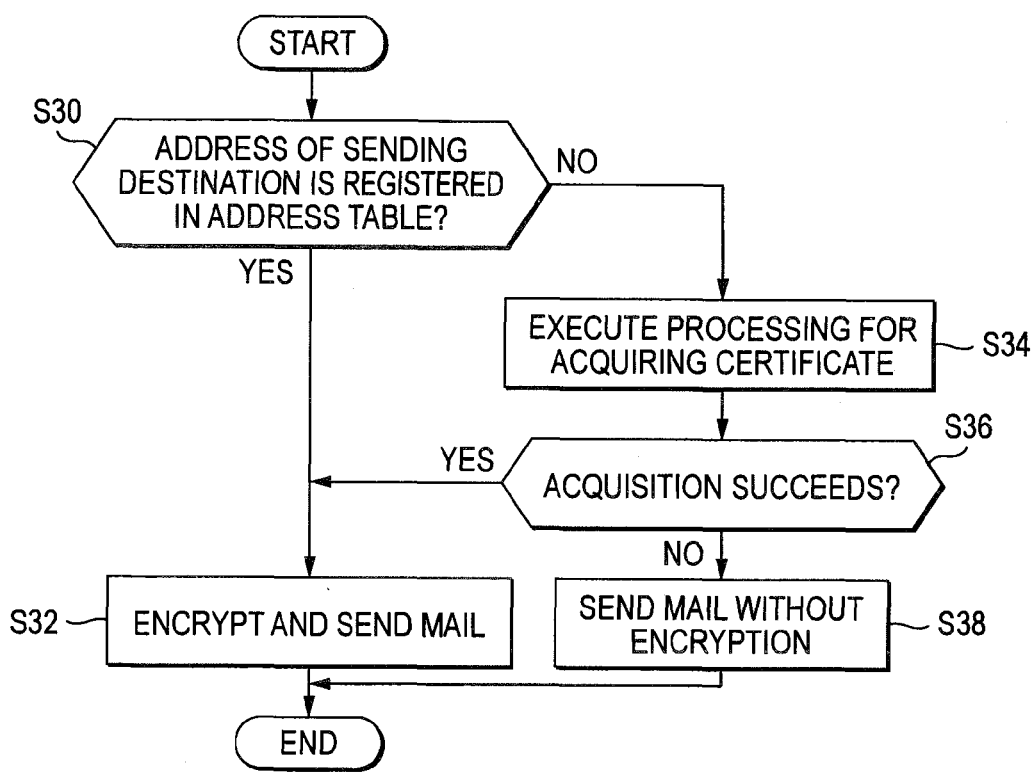
FIG. 7 shows still another flowchart of the communication processing executed by the multi-function device according to the first exemplary embodiment.

FIG. 7 shows a flowchart of processing executed when the multi-function device 10 sends electronic mail. For example, a user of the multi-function device 10 can execute an operation for sending electronic mail. The user can specify an electronic mail address (an electronic mail address of the multi-function device 40 in the first exemplary embodiment) of a sending destination of the electronic mail from the address table 28. In this case, the control unit 12 determines that the electronic mail address of the sending destination of the electronic mail is registered in the address table 28 (YES in S30). If YES in S30, the control unit 12 encrypts the electronic mail. That is, the control unit 12 encrypts an electronic mail text using a predetermined common key. Further, the multi-function device 10 specifies the certificate data 94 (see FIG. 4) corresponding to an electronic mail address of the multi-function device 40 from the certificate table 30 and specifies a public key of the multi-function device 40 from the certificate data 94. Then, the multi-function device 10 encrypts the common key using a public key of a multi-function device of the sending destination of the electronic mail and attaches the encrypted common key to the electronic mail. Further, the control unit 12 generates digest data by digesting the electronic mail text, encrypts the digest data using a self-secret key and attaches the encrypted digest data to the electronic mail. Then, the control unit 12 sends electronic mail including the encrypted electronic mail text, the encrypted common key and the encrypted digest data to the multi-function device of the sending destination (S32).

On the other hand, a user can input an electronic mail address, which is not stored in the address table 28, by operating the operation unit 16. Then, the user can execute an operation for sending the electronic mail. In this case, the control unit 12 determines NO in S30. If NO in S30, the control unit 12 executes processing for acquiring a device certificate of a multi-function device of a sending destination of electronic mail (S34). Concretely, the control unit 12 acquires the device certificate of the multi-function device of the sending destination of the electronic mail by executing S6 and S8 of FIG. 5. When the device certificate of the multi-function device of the sending destination of the electronic mail can be acquired (YES in S36), the control unit 12 performs the encryption processing, sends the electronic mail to the multi-function device of the sending destination (S32) and ends the sending processing of the electronic mail.

Incidentally, there are cases where the response including the device certificate cannot be received (NO in S10 of FIG. 5) even when the device certificate exchange request of S6 of FIG. 5 is sent. In this case, the control unit 12 determines NO in S36 and sends electronic mail without performing the encryption processing (S38) and ends the sending processing of the electronic mail.

When the control unit 12' of the multi-function device 40 receives the electronic mail sent from the multi-function device 10 in S32, the control unit 12' executes each processing as follows. (1) The control unit 12' specifies a self-secret key from a certificate table (that is, specifies secret key data of a table corresponding to FIG. 4). The control unit 12' acquires a common key by decoding an encrypted common key included in the electronic mail using the self-secret key. (2) The control unit 12' acquires an electronic mail text by decoding an encrypted electronic mail text included in the electronic mail using the common key acquired in (1). (3) The control unit 12' generates first digest data by digesting the electronic mail text acquired in (2). The control unit 12' specifies an electronic mail address of the multi-function device 10, which is a sending source of the electronic mail. The control unit 12' specifies a device certificate corresponding to the specified electronic mail address (that is, specifies certificate data of a certificate table corresponding to FIG. 4). The control unit 12' specifies a public key of the multi-function device 10 included in the specified device certificate. The control unit 12' generates second digest data by decoding encrypted digest data included in the electronic mail using the public key of the multi-function device 10. The control unit 12' verifies whether or not the first digest data matches with the second digest data and changes processing according to the verification result. For example, absence of warning is printed when the digest data matches, and presence of warning is printed when the digest data does not match. Incidentally, these processing are the processing of S18 in FIG. 6.

Second Exemplary Embodiment

A second exemplary embodiment of the invention will be described. Processing executed by each of a control unit 12 of a multi-function device 10 and a control unit 12' of a multi-function device 40 according to the second exemplary embodiment will be described. Incidentally, a configuration of a multi-function device system 2 and configurations of the multi-function devices 10, 40 are similar to those in the first exemplary embodiment.

Figure 8:
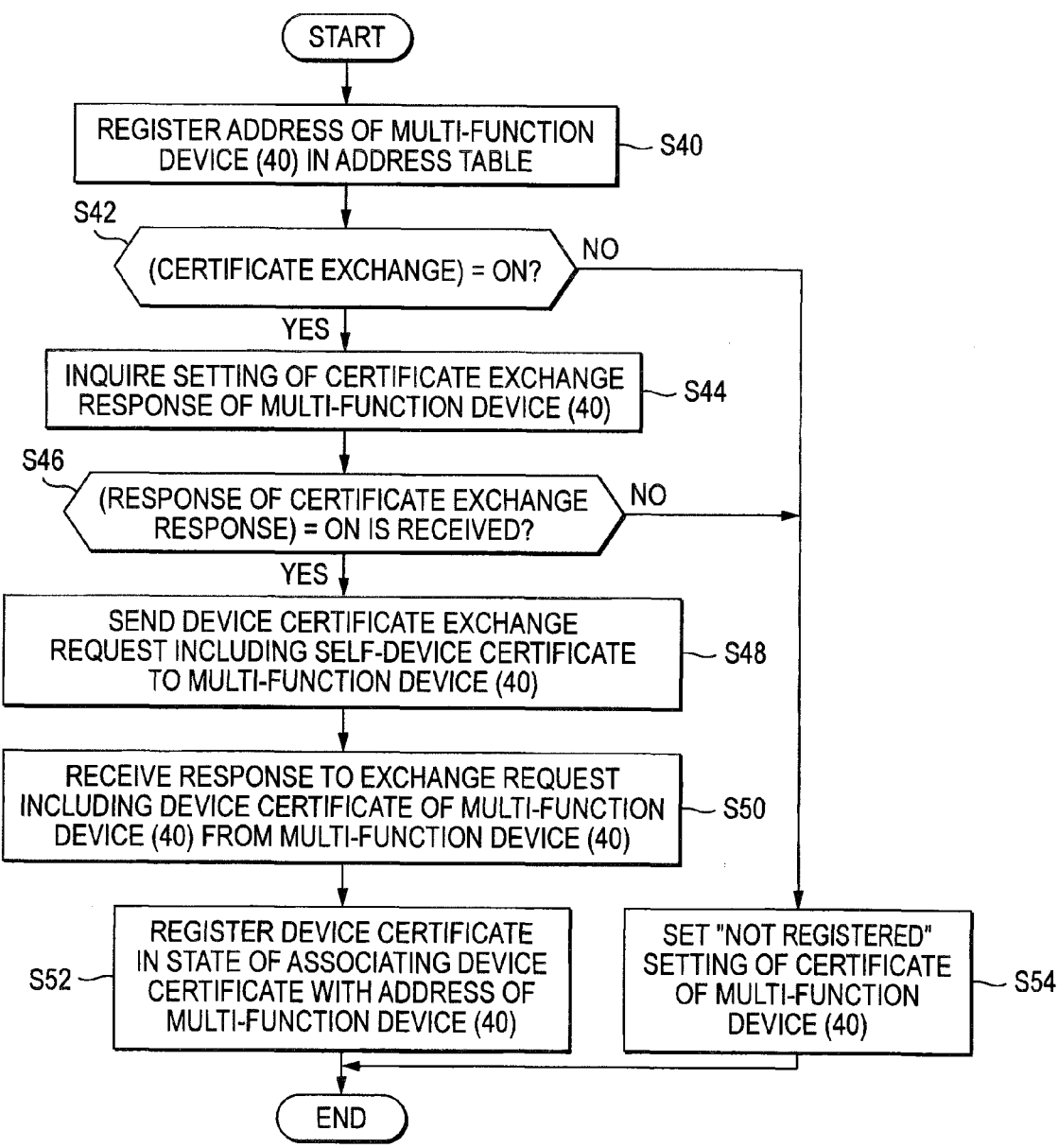
FIG. 8 shows still another flowchart of the communication processing executed by the multi-function device according to a second exemplary embodiment)

FIG. 8 shows a flowchart of processing executed when the multi-function device 10 registers an electronic mail address. When the control unit 12 registers an electronic mail address of the multi-function device 40 in an address table 28 (S40), the control unit 12 determines whether or not setting 64 of a certificate exchange of a device setting table 26 of the storage unit 24 becomes "ON" (S42). If the setting 64 of the certificate exchange is "ON" (YES in S42), the control unit 12 proceeds to S44. In contrast, if the setting 64 of the certificate exchange is "OFF" (NO in S42), the control unit 12 proceeds to S54.

The control unit 12 sends a command for inquiring setting of a certificate exchange response of a device setting table of the multi-function device 40 to the multi-function device 40 in S44. When the control unit 12 receives a response to the command sent in S44 from the multi-function device 40, the control unit 12 determines whether or not the received response is a response indicating that setting (setting corresponding to numeral 66 of FIG. 2) of the certificate exchange resporise of the multi-function device 40 is "ON" (S46). If the received response is the response indicating that the setting is "ON" (YES in S46), the control unit 12 proceeds to S48. In contrast, if the received response is the response indicating that the setting is "OFF" (NO in S46), the control unit 12 proceeds to S54.

The control unit 12 reads a self-device certificate (that is, certificate data 94 of combination information 104) out of a certificate table 30 in S48. Then, the control unit 12 sends a device certificate exchange request including the self-device certificate to the multi-function device 40. The control unit 12 receives a response to the device certificate exchange request sent in S48 from the multi-function device 40 (S50). Incidentally, since the control unit 12 has already received a response indicating that setting of a certificate exchange of the multi-function device 40 is "ON" in S46, so that a device certificate of the multi-function device 40 is included in a response received in S50. The control unit 12 changes the stored contents of the address table 28 in S52. That is, the control unit 12 turns "on" setting 78 (see FIG. 3) of encryption sending corresponding to an electronic mail address (that is, an electronic mail address registered in S16) of the multi-function device 40. Also, setting 74 (see FIG. 3) of a certificate corresponding to the electronic mail address of the multi-function device 40 is "registered" by the control unit 12. Further, the control unit 12 stores new combination information (see FIG. 4) including the received device certificate in the certificate table 30 (see FIG. 4) of the storage unit 24 in S52. Consequently, in the certificate table 30, the electronic mail address of the multi-function device 40 is written into a field of a mail address 92 and the device certificate of the multi-function device 40 is written into a field of the certificate data 94. As a result, the device certificate of the multi-function device 40 is registered in a state of being associated with the electronic mail address of the multi-function device 40 registered in the address table 28.

When S52 ends, the control unit 12 ends the processing. The control unit 12 changes the stored contents of the address table 28 in S54. That is, the control unit 12 turns "off" the setting 78 (see FIG. 3) of encryption sending corresponding to the electronic mail address of the multi-function device 40. Also, the setting 74 (see FIG. 3) of the certificate corresponding to the electronic mail address of the multi-function device 40 is "not registered" by the control unit 12. When S54 ends, the control unit 12 ends the processing.

Figure 9:
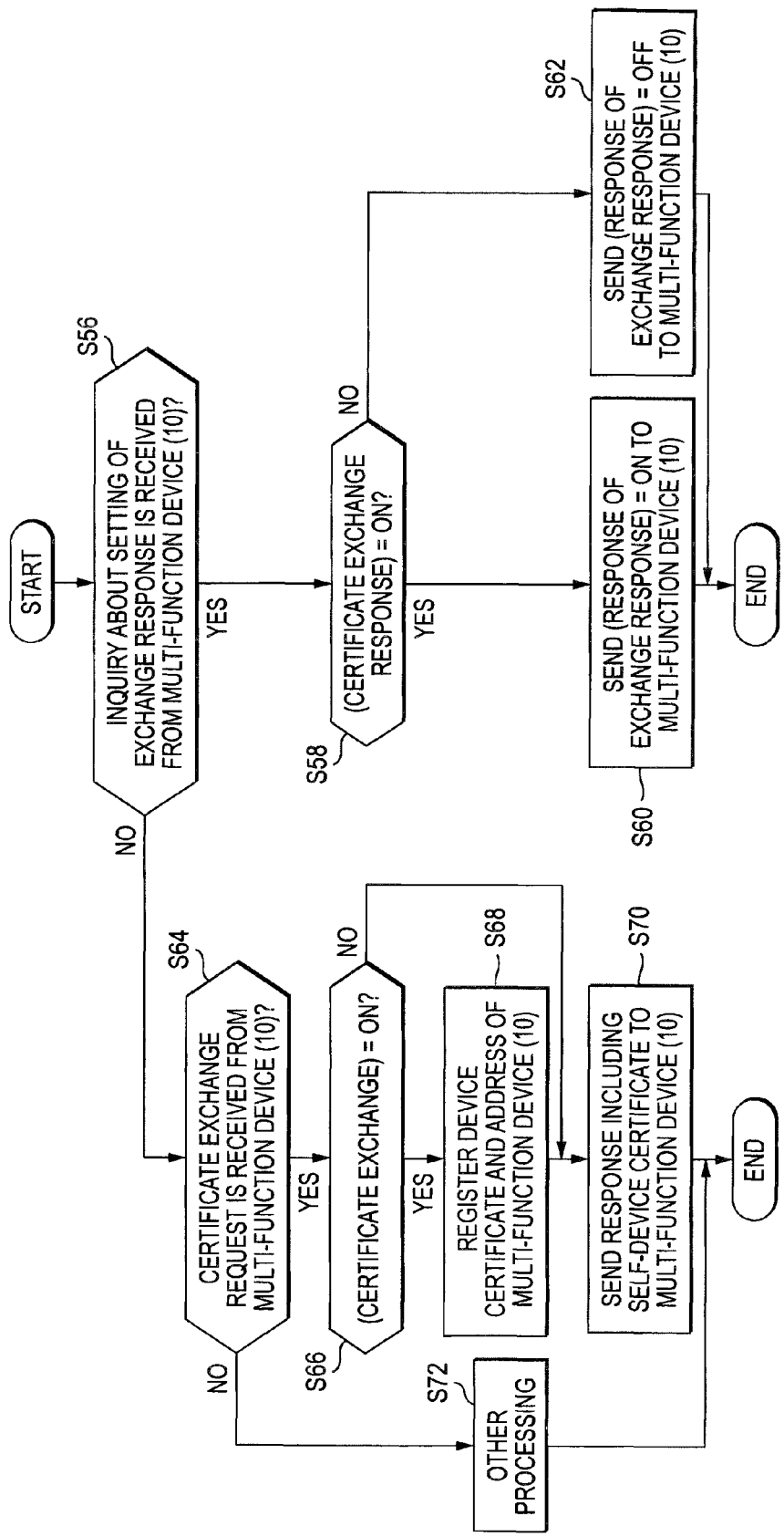
FIG. 9 shows another flowchart of the communication processing executed by the multi-function device according to the second exemplary embodiment.

Subsequently, processing executed by the control unit 12' of the multi-function device 40 will be described. FIG. 9 shows a flowchart of processing in which the control unit 12' of the multi-function device 40 acquires electronic mail from a POP3 server 8. The control unit 12' starts the present processing in the case of reaching the predetermined timing at which the presence or absence of electronic mail is inquired of the POP3 server 8. Then, the control unit 12' acquires electronic mail addressed to the multi-function device 40 from the POP3 server 8. When the control unit 12' acquires the electronic mail, the control unit 12' determines whether or not the acquired electronic mail is a device certificate exchange request from the multi-function device 10 (S56). If the electronic mail is the certificate exchange request (YES in S56), the control unit 12' proceeds to S58. In contrast, if the electronic mail is not the certificate exchange request (NO in S56), the control unit 12' proceeds to S64. The control unit 12' determines whether or not setting (setting corresponding to numeral 66 of FIG. 2) of a certificate exchange response of a device setting table of the multi-function device 40 is "ON" in S58. If the setting of the certificate exchange response is "ON" (YES in S58), the control unit 12' sends a response indicating that the setting of the certificate exchange response is "ON" to the multi-function device 10 (S60) and ends the processing. In contrast, if the setting of the certificate exchange response is "OFF" (NO in S58), the control unit 12' sends a response indicating that the setting of the certificate exchange response is "OFF" to the multi-function device 10 (S62) and ends the processing.

The control unit 12' determines whether or not the received electronic mail is a device certificate exchange request from the multi-function device 10 in S64. If the electronic mail is the certificate exchange request (YES in S64), the control unit 12' proceeds to S66. In contrast, if the electronic mail is not the certificate exchange request (NO in S64), the control unit 12' determines that the acquired electronic mail is encrypted electronic mail, performs receiving processing of electronic mail as similar to that of S18 in FIG. 6 (S72) and ends the processing. The control unit 12' determines whether or not setting (setting corresponding to numeral 64 of FIG. 2) of a certificate exchange of the device setting table of the multi-function device 40 is "ON" in S66. If the setting of the certificate exchange is "ON" (YES in S66), the control unit 12' proceeds to S68. In contrast, if the setting of the certificate exchange is "OFF" (NO in S66), the control unit 12' skips S68 and proceeds to S70.

The control unit 12' changes the stored contents of an address table (a table corresponding to the table 30 of FIG. 3) of the multi-function device 40 in S68. That is, when an electronic mail address of the multi-function device 10 is not registered in the address table, the control unit 12' newly registers the electronic mail address in the address table. Further, the control unit 12' turns "on" setting (setting corresponding to numeral 78 of FIG. 3) of encryption sending corresponding to the electronic mail address of the multi-function device 10. Also, setting (setting corresponding to numeral 74 of FIG. 3) of a certificate corresponding to the electronic mail address of the multi-function device 10 is "registered" by the control unit 12'. When the electronic mail address of the multi-function device 10 is registered in the address table, the control unit 12' updates the setting of the certificate and the setting of the encryption sending corresponding to the registered electronic mail address. Further, the control unit 12' stores new combination information including the received device certificate in a certificate table (a table corresponding to the table 30 of FIG. 4) of a storage unit in S68. When S68 ends, the control unit 12' proceeds to S70. The control unit 12' sends a response including the device certificate of the multi-function device 40 to the multi-function device 10 in S70. When S70 ends, the control unit 12' ends the processing.

Incidentally, in the first exemplary embodiment, the certificate exchange request is sent from the multi-function device 10 to the multi-function device 40 in FIG. 5. Alternatively, when the multi-function device 40 acquires the device certificate of the multi-function device 40, the device certificate exchange request is sent from the multi-function device 40 to the multi-function device 10. In this case, the subject of each processing disclosed in FIGS. 5 and 6 is reversed. Also, in the processing shown in FIG. 7 and the processing shown in FIGS. 8 to 10 of the second exemplary embodiment, the subject of each processing may be reversed.

The multi-function device system 2 of the second exemplary embodiment has been described. The multi-function device 10 can send a command for requesting an exchange of a device certificate to the multi-function device 40 in the case of registering an electronic mail address of the multi-function device 40 in the address table 28. As a result, the possibility of acquiring a device certificate of the multi-function device 40 which is a sending destination can be increased in the case of having to send electronic mail to the multi-function device 40. Also, the multi-function device 10 can send electronic mail encrypted using the device certificate of the multi-function device 40 to the multi-function device 40. The fact that an electronic mail address of the multi-function device 40 is registered in the address table 28 of the multi-function device 10 expects that there will be a high possibility that a user of the multi-function device 10 conducts communication by electronic mail with the multi-function device 40. By acquiring a device certificate of the multi-function device 40 in the case of registering an electronic mail address, encryption processing of its electronic mail is speedily performed in the case of sending electronic mail to the multi-function device 40 thereafter. Moreover, an electronic mail address of the multi-function device 40 is registered in the address table 28, so that a device certificate exchange request sent to the multi-function device 40 could be made to the registered electronic mail address. Hence, the device certificate of the multi-function device 40 can simply be acquired from the multi-function device 40.

Also, according to the multi-function device 10, a certificate exchange request including a self-device certificate can be sent to the multi-function device 40. As a result, the multi-function device 10 can send a self-device certificate when the self-device certificate is not sent to the multi-function device 40. That is, the mutual device certificates can easily be exchanged between the multi-function device 10 and the multi-function device 40.

Also, according to the multi-function device 10, a device certificate of a multi-function device of a sending destination can be acquired before sending of electronic mail in the case of having to send electronic mail to an address, which is not registered in the address table 28, of the multi-function device. As a result, the multi-function device 10 can encrypt a common key using a public key included in the acquired device certificate and can send the encrypted common key to the multi-function device of the sending destination. That is, the encrypted electronic mail can also be sent to the electronic mail address which is not registered in the address table 28.

The above-described exemplary embodiments are only illustrative and the claims are not limited thereby. The art described in the claims includes various modifications and changes of the concrete examples illustrated above.

The control unit 12 of the multi-function device 10 may perform display for inquiring a check of the setting 64 of a certificate exchange of a user on the display unit 14 every time a certificate exchange request is received. Also, the control unit 12 may perform display for inquiring a check of the setting 66 of a certificate exchange response of a user on the display unit 14 every time a command for inquiring the setting 66 of the certificate exchange response is received. In this case, the control unit 12 may send a response to a sending source of the certificate exchange request or a sending source of the command under condition that instructions to already check the setting are inputted from the user.

The technical elements described in the present specification or the drawings exert technical utility singly or various combinations, and are not limited to combinations described in the claims at the time of the application. Also, the art illustrated in the present specification or the drawings can simultaneously achieve plural purposes, and the achievement itself of one of the purposes has technical utility.

What is claimed is:

1. A communication apparatus comprising:
    a storage device storing computer readable instructions and comprising a device setting table, an address table and a certificate table; and
    a processor configured to execute the computer readable instructions, wherein the computer readable instructions cause the processor to implement:
    registering an e-mail address of a first communication apparatus in the address table, upon receiving a request to register the address of the first communication apparatus;
    retrieving a certificate exchange setting registered in the device setting table upon receiving the request to register the address of the first communication apparatus in the address table;
    determining whether the retrieved certificate exchange setting indicates that the communication apparatus is configured to require a certificate to transmit data to another communication apparatus;
    transmitting a first command to the e-mail address of the first communication apparatus in response to the determination that the retrieved certificate exchange setting indicates that the communication apparatus is configured to require a certificate to transmit data to another communication apparatus, wherein the first command is for requesting a first public key corresponding to a first secret key of the first communication apparatus;
    receiving the first public key from the first communication apparatus;
    registering the first public key in the certificate table in association with the e-mail address of the first communication apparatus;
    generating first encrypted data by encrypting first data using the first public key included in the certificate table when receiving a request to transmit the first data to the e-mail address of the first communication apparatus; and
    transmitting the first encrypted data to the e-mail address of the first communication apparatus.

2. The communication apparatus according to claim 1, wherein the computer readable instructions further cause the processor to implement:
    receiving a request to transmit second data to an e-mail address of a second communication apparatus, wherein the e-mail address of the second communication apparatus is not registered in the address table when the request is received;
    transmitting a second command for requesting a second public key corresponding to a second secret key of the second communication apparatus to the e-mail address of the second communication apparatus;
    receiving the second public key;
    generating second encrypted data by encrypting the second data using the second public key included in the second response; and
    transmitting the second encrypted data to the address of the second communication apparatus.

3. The communication apparatus according to claim 1, wherein the computer readable instructions further cause the processor to implement:
    transmitting a self-device certificate with the first command to the e-mail address of the first communication apparatus, wherein the self-device certificate is stored in the certificate table, and comprises a public key corresponding to a secret key of the communication apparatus.

4. The communication apparatus according to claim 1, the computer readable instructions further cause the processor to implement:
    receiving a third command for requesting the public key, stored in the certificate table, corresponding to the secret key of the communication apparatus; and
    transmitting the public key to a source of the third command.

5. The communication apparatus according to claim 4, wherein the computer readable instructions further cause the processor to implement:
    allowing a user to select whether the public key stored in the certificate table is to be sent in response to the third command;
    registering a certificate exchange response setting in accordance with selection by the user;
    upon receiving the third command, determining whether the certificate exchange response setting indicates that the communication apparatus is configured to transmit the pubic key stored in the certificate table; and
    transmitting the public key stored in the certificate table to the source of the third command when the determining determines that the certificate exchange response setting indicates that the communication apparatus is configured to transmit the public key stored in the certificate table.

6. The communication apparatus according to claim 4, wherein the computer readable instructions further cause the processor to implement:
    transmitting the public key stored in the certificate table to the source of the third command if a public key corresponding to a secret key of the source of the third command is included in the third command.

7. The communication apparatus according to claim 6, wherein the computer readable instructions further cause the processor to implement:
    registering the public key corresponding to the secret key of the source of the third command included in the third command, in the certificate table, in association with an e-mail address of the source.

8. The communication apparatus according to claim 1, wherein the first public key is included in a device certificate authenticated by a certification authority.

9. A non-transitory computer-readable recording medium comprising instructions for using a communication apparatus, comprising:
    registering an e-mail address of a first communication apparatus in an address table, upon receiving a request to register the address of the first communication apparatus;
    retrieving a certificate exchange setting registered in a device setting table upon receiving the request to register the address of the first communication apparatus in the address table;
    determining whether the retrieved certificate exchange setting indicates that the communication apparatus is configured to require a certificate to transmit data to another communication apparatus;

transmitting a first command to the e-mail address of the first communication apparatus in response to determination that the retrieved certificate exchange setting indicates that the communication apparatus is configured to require a certificate to transmit data to another communication apparatus, wherein the first command is for requesting a first public key corresponding to a first secret key of the first communication apparatus;

receiving the first public key from the first communication apparatus;

registering the first public key in a certificate table in association with the e-mail address of the first communication apparatus;

generating first encrypted data by encrypting first data using the first public key included in the certificate table when receiving a request to transmit the first data to the e-mail address of the first communication apparatus; and transmitting the first encrypted data to the e-mail address of the first communication apparatus.

* * * * *